United States Patent
Hayata et al.

(10) Patent No.: US 7,553,900 B2
(45) Date of Patent: Jun. 30, 2009

(54) AROMATIC POLYCARBONATE RESIN COMPOSITION, PROCESS FOR PRODUCING THE RESIN COMPOSITION, AND MOLDED OBJECT OF THE RESIN COMPOSITION

(75) Inventors: Yusuke Hayata, Chiba (JP); Akio Nodera, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 279 days.

(21) Appl. No.: 11/576,638

(22) PCT Filed: Sep. 28, 2005

(86) PCT No.: PCT/JP2005/017850

§ 371 (c)(1), (2), (4) Date: Apr. 4, 2007

(87) PCT Pub. No.: WO2006/038506

PCT Pub. Date: Apr. 13, 2006

(65) Prior Publication Data

US 2008/0033097 A1    Feb. 7, 2008

(30) Foreign Application Priority Data

Oct. 5, 2004    (JP) .............................. 2004-293001

(51) Int. Cl.
    C08K 3/04    (2006.01)
(52) U.S. Cl. ...................................... 524/496; 524/495

(58) Field of Classification Search ................. 524/495, 524/496

See application file for complete search history.

(56) References Cited

FOREIGN PATENT DOCUMENTS

| | | |
|---|---|---|
| JP | 2003 221510 | 8/2003 |
| JP | 2004 182842 | 7/2004 |
| JP | 2004 190026 | 7/2004 |
| JP | 2004 250549 | 9/2004 |
| JP | 2005 105015 | 4/2005 |

OTHER PUBLICATIONS

U.S. Appl. No. 11/908,292, filed Sep. 11, 2007, Nodera, et al.
U.S. Appl. No. 11/576,638, filed Apr. 4, 2007, Hayata, et al.

*Primary Examiner*—Peter Szekely
(74) *Attorney, Agent, or Firm*—Oblon, Spivak, McClelland, Maier & Neustadt, P.C.

(57) ABSTRACT

The present invention provides an aromatic polycarbonate resin composition including a resin component containing (A) 50 to 95% by mass of an aromatic polycarbonate resin and (B) 50 to 5% by mass of a polyester resin derived from natural sources and/or a polylactic acid obtained from synthetic lactic acid, and (C) 0.1 to 30 parts by mass of carbon nanotubes compounded in 100 parts by mass of the resin component, the aromatic polycarbonate resin composition being able to afford a molded object free from layer delamination and excellent in electrical conductivity (antistatic property), solvent resistance, flame retardancy, impact resistance, molding appearance, etc. and having good flowability.

8 Claims, No Drawings

AROMATIC POLYCARBONATE RESIN COMPOSITION, PROCESS FOR PRODUCING THE RESIN COMPOSITION, AND MOLDED OBJECT OF THE RESIN COMPOSITION

TECHNICAL FIELD

The present invention relates to a novel aromatic polycarbonate resin composition and, more specifically, to an aromatic polycarbonate resin composition which contains an aromatic polycarbonate resin, a polyester resin derived from natural sources and/or a polylactic acid obtained from synthetic lactic acid, carbon nanotubes and, if necessary, an elastomer, which can afford a molded object excellent in electrical conductivity (antistatic property), solvent resistance, flame retardancy, impact resistance, molding appearance, etc, and which has good flowability, to a process for producing such a resin composition and to a molded object of such a resin composition.

BACKGROUND ART

In recent years, information processing devices and electronic business machines have been rapidly prevailing as a result of the development of an electronic technology.

As the prevailing of the electronic appliances, electromagnetic interference occurring in peripheral equipments as a result of influence of noises generated from electronic parts and troubles, such as malfunction, caused by static electricity are increasing and get into big problems.

In order to solve these problems, there is a demand for materials which are excellent in electrical conductivity (antistatic property) and in static-controlling properties.

Hitherto, electrically conductive polymeric materials containing polymeric materials having low electrical conductivity with which electrically conductive fillers, etc. are compounded have been widely used.

Metal fibers, metal powder, carbon black, carbon fibers, etc. are generally used as the conductive fillers. The use of metal fibers and metal powder as the conductive fillers, however, has a drawback because corrosion resistance is poor and satisfactory mechanical strengths are hardly obtainable, although an effect of imparting excellent electrical conductivity is attained.

When carbon black is used as the conductive filler, electrically conductive carbon blacks, such as Ketchen black, Vulcan XC72 and acetylene black which can provide high electrical conductivity even with a small amount, are used. These carbon blacks, however, have poor dispersibility in a resin.

Since the dispersibility of carbon black has an influence upon the electrical conductivity of the resin composition, special blending and mixing techniques are required in order to obtain stable conductivity.

When carbon fibers are used as the conductive fillers, the desired strength and modulus of elasticity can be obtained by using ordinary reinforcing carbon fibers. However, in order to impart electrical conductivity, it is necessary to use the fibers in a high concentration, resulting in a deterioration of the physical properties inherent to the resin.

Further, since localization of the conductive filler is unavoidable when a molded object having a complicated shape is to be prepared, variation of conductivity is caused and desired electrical conductivity is not obtainable.

In the case of carbon fibers, fibers having a smaller diameter are expected to be able to impart better electrical conductivity provided the added amount of the fibers is the same, because the contact area between the resin and the fibers increases.

Extremely fine carbon fibrils having excellent electrical conductivity are proposed (see, for example, Patent Document 1).

When the fibrils are mixed with a resin, however, the dispersibility thereof in the resin is so poor that surface appearance of a molded object is deteriorated and is not satisfactory.

When the resin is to be colored and when carbon black for use as an ordinary pigment is used as a colorant, it is necessary to use the carbon black in a large amount in order to develop a black color. This causes problems of dispersibility in the resin and surface appearance of a molded object.

A method for adding extremely fine carbon fibrils is known (see, for example, Patent Document 2). However, there is no mention of flame retardancy which is influenced by the fine carbon fibrils.

The disclosed method results in low flame retardancy and is not applicable to an article which is required to have high flame retardancy.

There is known a resin composition containing a thermoplastic resin and carbon nanotubes and compounded with at least one compound selected from phosphorus compounds, phenol compounds, epoxy compounds and sulfur compounds (see, for example Patent Document 3). In the working examples, there is only disclosed polycarbonate resin/acrylonitrile-butadiene-styrene resin. There are no working examples at all which disclose a combination a polycarbonate resin with a polyester resin derived from natural resources or a polylactic acid obtained from synthetic lactic acid.

When carbon nanotubes are compounded in a large amount so as to develop electrical conductivity, a case is occasionally caused in which appearance is deteriorated or impact strength is lowered. Further, there is no mention of an improvement in solvent resistance.

Hitherto, a polycarbonate resin/polyolefin resin alloy has low compatibility and low impact strength. A molded object of such an alloy is apt to cause layer delamination and has poor appearance. Thus, it is indispensable to improve the compatibility.

[Patent Document 1] Japanese Publication of Translation of PCT No. S62-500943
[Patent Document 2] Japanese Unexamined Patent Publication No. H03-74465
[Patent Document 3] Japanese Unexamined Patent Publication No. 2004-182842

DISCLOSURE OF THE INVENTION

It is an object of the present invention to provide an aromatic polycarbonate resin composition which can afford a molded object free from layer delamination and excellent in electrical conductivity (antistatic property), solvent resistance, flame retardancy, impact resistance, molding appearance, etc. and which is excellent in fluidity, a process for producing such a resin composition, and a molded object of such a resin composition.

The present inventors have made an earnest study on the above-described problems, have found that, by compounding a predetermined amount of carbon nanotubes and, if necessary, an elastomer in a mixture containing a specific proportion of an aromatic polycarbonate resin and a polyester resin derived from natural sources or a polylactic acid obtained from synthetic lactic acid, the phase structure of the aromatic polycarbonate resin/polyester resin derived from natural sources or polylactic acid obtained from synthetic lactic acid is stabilized and re-aggregation of the polyester resin derived from natural sources or polylactic acid obtained from synthetic lactic acid during melting and domain orientation during injection molding can be reduced, and have arrived at the present invention.

Namely, the present invention provides:

1. An aromatic polycarbonate resin composition comprising 100 parts by mass of a resin component containing (A) 50 to 95% by mass of an aromatic polycarbonate resin and (B) 50 to 5% by mass of a polyester resin derived from natural sources and/or a polylactic acid obtained from synthetic lactic acid; and (C) 0.1 to 30 parts by mass of carbon nanotubes compounded in the resin component;

2. The aromatic polycarbonate resin composition of 1 above, wherein ingredient (A) has a viscosity average molecular weight of 10,000 to 40,000;

3. The aromatic polycarbonate resin composition as defined in 1 or 2 above, wherein ingredient (B) is a polylactic acid;

4. The aromatic polycarbonate resin composition as defined in any one of 1 to 3 above, wherein ingredient (C) has a content of amorphous carbon particles of 20% by mass or less, an outer diameter of 0.5 to 120 nm and a length of 500 nm or more;

5. The aromatic polycarbonate resin composition as defined in any one 1 to 4 above, further comprising (D) 0 to 20 parts by mass of an elastomer per 100 parts by mass of a total amount of ingredient (A) and ingredient (B);

6. The aromatic polycarbonate resin composition as defined in any one of 1 to 5 above, wherein the composition is for office automation equipment, information and telecommunication equipment, automobile parts or electrical household equipment;

7. A process for producing an aromatic polycarbonate resin composition as automobile parts or in any one of 1 to 6 above, comprising melting and kneading ingredient (B) and ingredient (C), then adding ingredient (A), or ingredient (A) and ingredient (C) to the kneaded mixture, and melting and kneading the resulting mixture; and 8. A molded object obtainable by using an aromatic polycarbonate resin composition as defined in any one of 1 to 6 above.

BEST MODE FOR CARRYING OUT THE INVENTION

In an aromatic polycarbonate resin composition according to the present invention, a combination of (A) 50 to 95% by mass of an aromatic polycarbonate resin and (B) 50 to 5% by mass of a polyester resin is used as a resin component.

When the contents of ingredient (A) and ingredient (B) in the resin component fall in the above range, the aromatic polycarbonate resin composition obtained can sufficiently exhibit the characteristics of the aromatic polycarbonate resin and is excellent in solvent resistance and impact resistance.

The preferable contents of ingredient (A) and ingredient (B) are 60 to 95% by mass of ingredient (A) and 5 to 40% by mass of ingredient (B).

In an aromatic polycarbonate resin composition according to the present invention, (C) carbon nanotubes are compounded in an amount of 0.1 to 30 parts by mass, preferably 0.3 to 20 parts by mass, more preferably 0.4 to 10 parts by mass, particularly preferably 0.5 to 5 parts by mass, per 100 parts by mass of a total amount of ingredient (A) and ingredient (B).

When the compounding amount of carbon nanotubes is 0.1 part by mass or more, the electrical conductivity (antistatic property) and flame retardancy of the aromatic polycarbonate resin composition according to the present invention are improved. When the amount is 30 parts by mass or less, the characteristics of the resin composition improve in correspondence to the compounding amount and the impact resistance and moldability increase.

The aromatic polycarbonate resin (A) in the present invention is not specifically limited and various polycarbonate resins may be mentioned.

An aromatic polycarbonate resin produced by reaction of a dihydric phenol with a carbonate precursor may be generally used.

Namely, a product produced by reaction of a dihydric phenol with a carbonate precursor in a solution method or a melting method, such as a reaction of a dihydric phenol with phosgene or a transesterification reaction between a dihydric phenol and diphenyl carbonate, etc., can be employed.

As the dihydric phenol, a variety of phenols may be mentioned. Specific examples include 2,2-bis(4-hydroxyphenyl) propane (bisphenol A), bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ketone and halogen-substituted compounds thereof.

Particularly, preferable dihydric phenols are bis(hydroxyphenyl)alkane compounds. In particular, dihydric phenols using bisphenol A as a major starting material is preferred.

Examples of the carbonate precursor include carbonyl halides, carbonyl esters, and haloformates. Specific examples include phosgene, dihydric phenol dihaloformate, diphenyl carbonate, dimethyl carbonate and diethyl carbonate.

As other dihydric phenols, there may be mentioned hydroquinone, resorcin, catechol, etc.

These dihydric phenols may be used singly or as a mixture of two or more thereof.

Incidentally, the aromatic polycarbonate resin may have a branched structure. As a branching agent, use may be made of 1,1,1-tris(4-hydroxyphenyl)ethane, α,α',α"-tris(4-hydroxyphenyl)-1,3,5-triisopropylbenzene, phloroglucin, trimellitic acid and isatinbis(o-cresol).

For the adjustment of the molecular weight, use may be made of phenol, p-t-butylphenol, p-t-octylphenol, p-cumylphenol, etc.

The aromatic polycarbonate resin used in the present invention may be a copolymer having a polycarbonate moiety and a polyorganosiloxane moiety or a polycarbonate resin containing such a copolymer.

The aromatic polycarbonate resin may also be a polyester-polycarbonate resin which is obtainable by polymerization for forming polycarbonate in the presence of a bi-functional carboxylic acid such as terephthalic acid or an ester precursor such as an ester-forming derivative of the bi-functional carboxylic acid.

A mixture of a variety of polycarbonate resins may also be employed.

The aromatic polycarbonate resin employed in the present invention generally has a viscosity average molecular weight of 10,000 to 40,000, preferably 13,000 to 30,000, more preferably 14,000 to 27,000 from the viewpoint of mechanical strengths and moldability.

As a polyester resin derived from natural sources which is ingredient (B) in the present invention, there may be mentioned polylactic acid, poly(3-hydroxybutyrate), a copolymer of 3-hydroxybutyrate and 3-hydroxyvarelate, etc.

Above all, polylactic acid is most preferable. As polylactic acid, use may be made of polylactic acid obtained from synthetic lactic acid.

Lactic acid which is a raw material of polylactic acid may be L-form, D-form or raceme form. Lactic acid obtained by a chemical synthesis method or a fermentation synthesis method may be used. From the standpoint of bio-recycle, lactic acid obtained by lactic acid fermentation of starch such as corn which has a low environmental load factor is preferably used.

Polylactic acid which is used as ingredient (B) employed in the present invention may be one which is obtained using the above-described lactic acid as a raw material by (1) a two stage process in which a lactide obtained by a ring-forming reaction is subjected to a ring-opening polymerization to obtain a polymer or (2) a one stage process in which lactic acid is directly polymerized to obtain a polymer.

In the two-stage process, a high molecular weight polylactic acid can be obtained according to the following reaction formula:

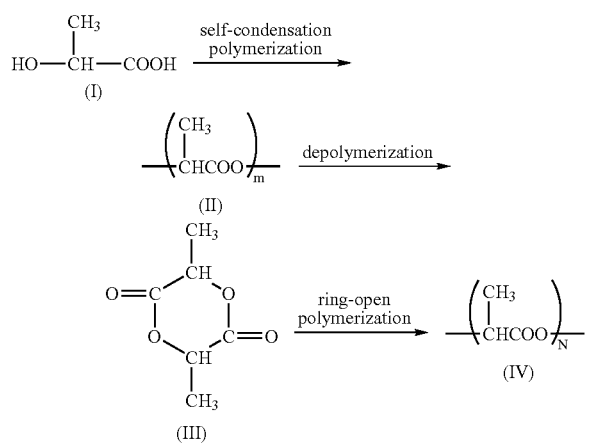

wherein m and n each represent a degree of polymerization.

Lactic acid (I) is first subjected to self-condensation polymerization to produce a low molecular weight polylactic acid (II). The thus obtained low molecular weight polylactic acid (II) is depolymerized to obtain a lactide (III) which is a cyclic diester. A high molecular weight polylactic acid (IV) is then obtained by ring-open polymerization of the lactide (III).

The polylactic acid used in the present invention has a weight average molecular weight of generally 100,000 to 250,000, preferably 130,000 to 200,000, a melting point of generally 130 to 160° C., and a glass transition temperature of generally 50 to 60° C.

By using the polylactic acid, it is possible to impart high fluidity, solvent resistance and impact resistance to the aromatic polycarbonate resin composition of the present invention.

The carbon nanotubes (C) in the present invention are a tubular hollow fibrous substance made of carbon and having an outer diameter of preferably 0.5 to 120 nm and a length of preferably at least 500 nm. The outer diameter is more preferably 1 to 100 nm and the length is more preferably 800 to 15,000 nm.

When the outer diameter of the carbon nanotubes is 0.5 nm or more, they can be easily dispersed so that the electrical conductivity (antistatic property) increases. When the outer diameter is not greater than 120 nm, molded objects have a good appearance and an increased electrical conductivity (antistatic property).

When the length of the carbon nanotubes is 500 nm or more, particularly 800 nm or more, a satisfactory electrical conductivity (antistatic property) is obtainable. When the length is not greater than 15,000 nm, the molded objects have a good appearance and the carbon nanotubes can be easily dispersed.

A content of amorphous carbon particles contained as impurities in the carbon nanotubes is preferably 20% by mass or less from the standpoint of electrical conductivity (antistatic property) and flame retardancy of the aromatic polycarbonate resin composition of the present invention.

A content of amorphous carbon particles not more than 20% by mass can improve the electrical conductivity (antistatic property) and is also effective to prevent deterioration during a molding stage.

By compounding carbon nanotubes, a phase structure of the aromatic polycarbonate resin/polyester resin can be stabilized so that re-aggregation of the polyester resin during melting and domain orientation during injection molding can be reduced.

Various known carbon nanotubes and carbon micro-coils may be used as carbon nanotubes in the present invention.

The carbon nanotubes may be prepared by a catalytic chemical vapor deposition method (CCVD method) using an iron or cobalt base catalyst introduced into pores of zeolite, a chemical vapor deposition method (CVD method), a laser ablation method, an arc discharge method using a carbon rod, carbon fibers, etc.

It is not always necessary that the ends of carbon nanotubes should have a tubular shape. It is permissive that the shape be deformed into, for example, a conical form.

While the carbon nanotubes used may have a closed-end or open-end structure, an open-end structure is preferred.

Carbon nanotubes having a closed-end structure may be converted into an open-end structure by a chemical treatment with nitric acid, etc.

Further, the carbon nanotubes may have a multi layer or single layer structure.

The aromatic polycarbonate resin composition of the present invention may be produced using a master batch composed of the polyester resin and carbon nanotubes.

If necessary, 0 to 20 parts by mass, preferably 1 to 10 parts by mass, of an elastomer as ingredient (D) per 100 parts by mass of a total amount of ingredient (A) and ingredient (B) may be compounded into the aromatic polycarbonate resin composition of the present invention.

When the compounding amount of the elastomer is within the above range, the impact resistance of the aromatic polycarbonate resin composition is further improved.

As the elastomer of ingredient (D), a graft rubber-like elastics of a core/shell type may be preferably used.

The core/shell type graft rubber-like elastics has a two-layer structure composed of a core and a shell.

The core part is in a soft rubber-like form while the shell part on the surface of the core part is a hard resin-like form. Preferably used is a graft rubber-like elastics in which the rubber-like elastics itself is in the form of powder (in the form of particles).

Even after the core/shell type graft rubber-like elastics has been melted and blended with the aromatic polycarbonate resin composition of the present invention, a greater part thereof remains in the original powder (particle) form.

Therefore, the graft rubber-like elastics is uniformly dispersed in the aromatic polycarbonate resin composition of the present invention and surface layer delamination hardly occurs.

As an example of the core/shell type graft rubber-like elastics, a product obtained by polymerizing one or at least two vinyl base monomers, such as styrene, in the presence of one or at least two rubber-like polymers obtained from a monomer or monomers mainly including an alkyl acrylate, an alkyl methacrylate and dimethylsiloxane is suitably used.

The alkyl acrylate and alkyl methacrylate preferably have a $C_2$ to $C_{10}$ alkyl group and may be, for example, ethyl acrylate, butyl acrylate, 2-ethylhexyl acrylate and n-octyl methacrylate.

As an elastomer obtainable by using a monomer mainly including an alkyl acrylate, there may be suitably used a copolymer obtained by reacting 70% by mass or more of an alkyl acrylate with 30% by mass or less of a copolymerizable vinyl monomer such as methyl methacrylate, acrylonitrile, vinyl acetate or styrene.

Further, such an elastomer may be cross-linked using a polyfunctional compound such as divinylbenzene, ethylene dimethacrylate, triallyl cyanurate or triallyl isocyanurate.

The elastomer may be also a product obtained by polymerizing or copolymerizing an aromatic vinyl compound such as styrene and $\alpha$-methylstyrene, an acrylic ester such as methyl acrylate and ethyl acrylate, and a methacrylic ester such as methyl methacrylate and ethyl methacrylate in the presence of a rubber-like polymer.

Further, the elastomer may be a product obtained by copolymerizing, together with the above monomer or monomers, a vinyl cyanide compound such as acrylonitrile and methacrylonitrile, or a vinyl ester compound such as vinyl acetate and vinyl propionate.

As the above polymers and copolymers, there may be used those obtained by various methods such as a bulk polymerization method, a suspension polymerization method and an emulsion polymerization method. Of these methods, a product obtained by an emulsion polymerization method is particularly suitably used.

Further, as the core/shell type rubber-like elastics, there may be used MAS resin elastics obtained by graft copolymerizing 20 to 40% by mass of styrene and methyl methacrylate with 60 to 80% by mass of n-butyl acrylate.

Also may be used a composite rubber base graft copolymer obtained by graft-polymerizing at least one vinyl monomer with a composite rubber having an average particle diameter of about 0.01 to 1 µm and having a structure in which 5 to 95% by mass of a polysiloxane rubber component is intertwined with 95 to 5% by mass of a poly (meth)acrylate rubber component such that they can not be separated from each other.

Examples of the core/shell type graft rubber-like elastic bodies having the above-described various forms, which may be commercially available, include Hibrane B621 (manufactured by Zeon Corporation), KM-357P (manufactured by Kureha Chemical Industry Co., Ltd.), and METABLEN W529, METABLEN S2001 and C223A (manufactured by Mitsubishi Rayon Co., Ltd.).

To the aromatic polycarbonate resin composition of the present invention, other resins and additives such as a pigment, a dye, a reinforcing agent, a filler, a heat resisting agent, an oxidation-deterioration preventing agent, a weather-resist agent, a lubricant, a mold release agent, a crystallization nucleating agent, a plasticizer, a fluidity improving agent and an anti-static agent, during a mixing stage or molding stage, as long as the properties of the resin composition is not adversely affected.

As a process for producing the aromatic polycarbonate resin composition of the present invention, there may be mentioned a method in which respective ingredients are melted and kneaded in a customarily known manner.

For example, there may be suitably selected a method in which respective ingredients are dispersed and mixed using a high speed mixer typically such as a turnable mixer, a Henschel mixer, a ribbon blender or a super mixer, and then melted and kneaded using an extruder, a Banbury mixer or rolls.

As the production method, although there may be adopted a method in which respective ingredients are charged at the same time for melting and kneading. However, the electrical conductivity (antistatic property) can be improved and the phase structure of the aromatic polycarbonate resin/polyester resin can be stabilized, when the polyester resin and carbon nanotubes are previously melted and kneaded with the resulting mixture being thereafter melted and kneaded with the aromatic polycarbonate resin, etc.

As the method for melting and kneading, the polyester resin and carbon nanotubes may be first melted and kneaded in an extruder, to which other ingredients such as the aromatic polycarbonate resin may be added from a midway of the extruder Alternatively, a previously prepared master batch of the polyester resin and carbon nanotubes may be used.

The content of the carbon nanotubes in the master batch is preferably 5 to 40% by mass.

Because the aromatic polycarbonate resin composition according to the present invention has the above-described characteristics, it is suitably used for office automation equipment, information and telecommunication equipment, automobile parts or electric household equipment.

The present invention also provides a molded object obtained by using the above-described aromatic polycarbonate resin composition.

EXAMPLES

The present invention will be next described in detail by way of examples. However, the present invention is not limited to the following examples.

Examples 1 to 4 and Comparative Examples 1 to 3

Respective ingredients were formulated in the proportions shown in Table 1, introduced to a vent-type twin-screw extruder (model: TEM35, manufactured by Toshiba Machine Co., Ltd.) and melted and kneaded at 280° C. for pelletization.

The thus obtained pellets were dried at 120° C. for 10 hours and then injection-molded at 280° C. (mold temperature: 80° C.) to obtain test pieces.

The thus obtained test pieces were evaluated for their performance on the following tests. The results are shown in Table 1.

The formulated ingredients and performance evaluation methods are as follows.

[Formulated Ingredients]

(A) Aromatic polycarbonate resin PC: A1900 (manufactured by Idemitsu Kosan Co., Ltd.), viscosity average molecular weight: 19,500

(B) Polylactic acid PLA: Lacea H-100 (manufactured by Mitsui Chemicals, Inc., weight average molecular weight: 100,000)

(C) Carbon nanotubes: Multi-Wall, diameter: 10 to 30 nm, length: 1 to 10 µm, both ends opened, amorphous carbon particle content: 15% by mass (manufactured by Sun Nanotech Co., Ltd.)

(B)+(C): PLA/carbon nanotube MB: master batch of carbon nanotubes and polylactic acid Lacea H-100; master batch produced using a twin-screw extruder (TEM-35) at a set temperature of 220° C.

(D) Elastomer MAS: METABLEN W450 (manufactured by Mitsubishi Rayon Co., Ltd.)

[Performance Evaluation Methods]

(1) IZOD (Izod impact strength): in accordance with ASTM D256, 23° C. (thickness: ⅛ in (0.32 cm)), unit: kJ/m$^2$ (2) Volume intrinsic resistance: in accordance with JIS K6911 (test flat plate: 80×80×3 mm), unit: Ω

(3) Appearance of molding: evaluated with naked eyes (4) Solvent resistance: A test piece is immersed in gasoline for 10 minutes and then bent with hands. The solvent resistance is evaluated in terms of a change in appearance of the bent test piece.

(5) Solvent resistance: A test piece is immersed in gasoline for 10 minutes and then bent with hands. The solvent resistance is evaluated in terms of a change in appearance of the bent test piece.

(6) Flame retardancy: combustion test in accordance with UL94 (thickness of test piece: 3.0 mm)

From Table 1, the following facts were found:

In the case of Examples, impact resistance, electrical conductivity (antistatic property), solvent resistance, flame retardancy and appearance of moldings are excellent. When the master batch is used, the impact resistance and electrical conductivity (antistatic property) are further improved.

In contrast thereto, it is seen from Comparative Example 1 that the use of the aromatic polycarbonate resin by itself fails to impart any electrical conductivity (antistatic property) and results in low solvent resistance.

From Comparative Example 2, it is seen that the use of the aromatic polycarbonate resin alone as the resin component cannot improve the electrical conductivity (antistatic property), solvent resistance or flame retardancy and results in deterioration of the appearance of the molding, even when the carbon nanotubes are added in the same amount as that in Examples 1 and 2.

In Comparative Example 3, the same aromatic polycarbonate resin and polylactic acid as used in Examples 3 and 4 are used. However, since no carbon nanotubes are added, neither the electrical conductivity (antistatic property) nor flame retardancy is developed. Further, the impact resistance is low.

INDUSTRIAL APPLICABILITY

The aromatic polycarbonate resin composition of the present invention has a stabilized phase structure of aromatic polycarbonate/polyester resin derived from natural sources and/or polylactic acid obtained from synthetic lactic acid, is free of layer delamination, and shows excellent electrical conductivity (antistatic property), solvent resistance, fluidity, flame retardancy, impact resistance, molding appearance, etc.

Therefore, it is expected that the application field of the composition is expanded to include office automation equipment, information and telecommunication equipment, housings or parts of automobiles and electric or electronic appliances such as electric household equipment, and further, automobile parts, etc.

The invention claimed is:

1. An aromatic polycarbonate resin composition comprising 100 parts by mass of a resin component containing (A) 50 to 95% by mass of an aromatic polycarbonate resin and (B) 50 to 5% by mass of a polyester resin derived from natural sources and/or a polylactic acid obtained from synthetic lactic acid; and (C) 0.1 to 30 parts by mass of carbon nanotubes compounded in the resin component.

2. The aromatic polycarbonate resin composition as defined in claim 1, wherein ingredient (A) has a viscosity average molecular weight of 10,000 to 40,000.

3. An aromatic polycarbonate resin composition as defined in claim 1, wherein ingredient (B) is a polylactic acid.

4. An aromatic polycarbonate resin composition as defined in claim 1, wherein ingredient (C) has a content of amorphous carbon particles of 20% by mass or less, an outer diameter of 0.5 to 120 nm and a length of 500 nm or more.

5. An aromatic polycarbonate resin composition as defined in claim 1, further comprising (D) 0 to 20 parts by mass of an elastomer per 100 parts by mass of a total amount of ingredient (A) and ingredient (B).

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| Formulation proportion (part by mass) | Ingredient (A) | PC | 95 | 95 | 80 | 80 | 100 | 100 | 80 |
| | Ingredient (A) | PLA | | 5 | | 20 | | | 20 |
| | Ingredient (A) | carbon nanotubes | | | 0.5 | | 2 | 0.5 | |
| | Ingredients (B) + (C) | PLA/carbon nanotubes MB | 5/0.5 | | | 20/2 | | | |
| | Ingredient (D) | Elastomer | | | 3 | 3 | | | 3 |
| Evaluation | IZOD impact strength (KJ/m$^2$) | | 85 | 80 | 62 | 50 | 85 | 40 | 20 |
| | Volume intrinsic resistance (Ω) | | $3 \times 10^{12}$ | $8 \times 10^{12}$ | $5 \times 10^3$ | $8 \times 10^3$ | $>10^{16}$ | $>10^{16}$ | $>10^{16}$ |
| | Appearance of molding | | no problem | no problem | no problem | no problem | no problem | silver | flow marks |
| | Fluidity (SFL 2 mm at 260° C.) | | 24 | 24 | 40 | 42 | 15 | 14 | 43 |
| | Solvent resistance | | slightly crazed | slightly crazed | no change | no change | cracked | cracked | no change |
| | Flame resistance | 3 mm | V-1 | V-1 | V-1 | V-1 | V-2 | V-2 | V-2 |

6. An aromatic polycarbonate resin composition as defined in claim 1, wherein the composition is for OA appliances, information and transmission appliances, automobile parts or domestic electric appliances.

7. A process for producing an aromatic polycarbonate resin composition as defined in claim 1, comprising melting and kneading ingredient (B) and ingredient (C), then adding ingredient (A), or ingredient (A) and ingredient (C) to the kneaded mixture, and melting and kneading the resulting mixture.

8. A molded object obtainable by using an aromatic polycarbonate resin composition as defined in claim 1.

* * * * *